(12) United States Patent
Barnes et al.

(10) Patent No.: US 8,033,460 B2
(45) Date of Patent: Oct. 11, 2011

(54) SYSTEM AND METHOD FOR OBTAINING PRODUCT INFORMATION THROUGH A CELLULAR TELEPHONE

(75) Inventors: Bruce Barnes, Crystal Lake, IL (US);
Shadi Khoshaba, Skokie, IL (US);
Wayne Heinmiller, Elgin, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 763 days.

(21) Appl. No.: 11/759,612

(22) Filed: Jun. 7, 2007

(65) Prior Publication Data
US 2008/0305827 A1    Dec. 11, 2008

(51) Int. Cl.
*G06K 15/00* (2006.01)
(52) U.S. Cl. ....................................... 235/383
(58) Field of Classification Search ............. 235/383, 235/385, 462.13
See application file for complete search history.

(56) References Cited

U.S. PATENT DOCUMENTS

| | | | |
|---|---|---|---|
| 5,216,228 A | 6/1993 | Hashimoto | |
| 5,640,193 A * | 6/1997 | Wellner | ............... 725/100 |
| 6,212,401 B1 | 4/2001 | Ackley | |
| 6,993,573 B2 | 1/2006 | Hunter | |
| 7,195,157 B2 * | 3/2007 | Swartz et al. | ............... 235/383 |
| 2002/0161658 A1 | 10/2002 | Sussman | |
| 2003/0001017 A1 | 1/2003 | Konda | |
| 2005/0091124 A1 | 4/2005 | White | |
| 2005/0205671 A1 | 9/2005 | Gelsomini et al. | |
| 2005/0236480 A1 | 10/2005 | Vrotsos et al. | |
| 2007/0162350 A1 * | 7/2007 | Friedman | ............... 705/26 |
| 2008/0283584 A1 * | 11/2008 | Ollikainen et al. | ............... 235/375 |

OTHER PUBLICATIONS

"New Bar Codes Can Talk With Your Cell Phone," Louise Story, CNET News.com, San Francisco, California, 4 pgs., Apr. 2, 2007.
"GSD&M Makes the Call, Goes Into Mobile Phone Advertising," Lilly Rockwell, Austin American-Statesman, Austin, Texas, Apr. 10, 2007.

* cited by examiner

*Primary Examiner* — Daniel Hess
(74) *Attorney, Agent, or Firm* — Moazzam & Associates, LLC

(57) ABSTRACT

A mobile communication device scans a barcode of a product and comprises a scanner, a processing module, and a receiving module. The scanner scans the barcode. The processing module is in communication with the scanner, and sends a coded information received from the scanner to an information provider. The receiving module is in communication with the processing module, and receives a product information from the information provider as a voice message and sends the product information to the processing module.

16 Claims, 3 Drawing Sheets

SYSTEM AND METHOD FOR OBTAINING PRODUCT INFORMATION THROUGH A CELLULAR TELEPHONE

FIELD OF THE DISCLOSURE

The present disclosure generally relates to telecommunications, and relates more particularly to a system and method for obtaining product information through a cellular telephone.

BACKGROUND

Consumers often want more information about a product prior to purchase than what is available on the product's packaging or in advertisements. There are of course multiple sources of such information, but most of these sources are not available at the point of purchase. It has been proposed to equip cellular telephones with a scanner capable of reading a barcode on a product, and retrieving information about the product through the cellular telephone. U.S. Pat. No. 6,993,573, for example, shows a camera-enabled cellular telephone that takes a picture of a barcode, transmits information from the barcode, receives content from the Internet for the barcode, and displays the content on a display screen.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
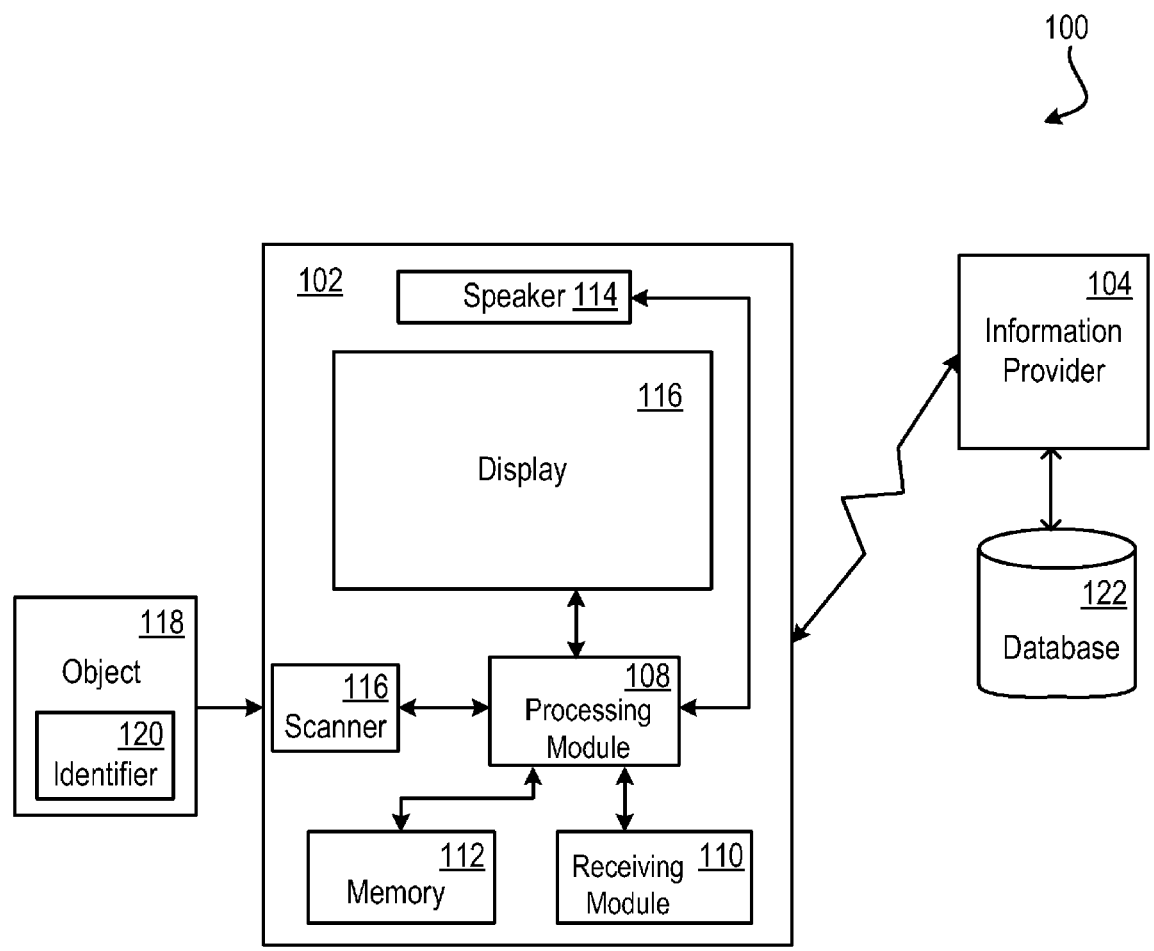
FIG. 1 is a block diagram of a product information retrieval system.

FIG. 1 shows a block diagram of a product information retrieval system 100 including a mobile communication device 102 and an information provider 104. The mobile communication device 102 is preferably a cellular telephone, a personal digital assistant (PDA), or any other device capable of wireless communication with the information provider 104. The mobile communication device 102 includes a scanner 106, a processing module 108, and a receiving module 110 to receive and process information. The mobile communication device 102 also includes a memory 112, a speaker 114, and a display 116 to output information to a user.

The scanner 106 is preferably a universal product code (UPC) barcode label reader, a radio frequency identification (RFID) reader, or a built-in camera of the mobile communication device 102. Therefore, the scanner 106 is able to 'read' multiple types of barcodes, such as a UPC barcode (as a barcode reader), an RFID signal (as an RFID reader), and/or a two-dimensional barcode (as a built-in camera). A user approaches an object 118, such as a product in a store or at home, and brings the mobile communication device 102 into proximity with an identifier 120 such as a barcode associated with the object. The scanner 106 retrieves coded information from the identifier 120 and sends the coded information to the processing module 108. The processing module is any computer processor capable of performing multiple operations on digital information in the mobile communication device 102. The processing module 108 then sends the coded information to the information provider 104.

The information provider 104 is preferably a wireless provider that supplies the mobile communication device 102 with conventional wireless voice and/or data service. The information provider 104 uses the coded information to determine where to find the information associated with the object 108, such as in a database 122. The database 122 may be a web page, an object manufacturer database and/or a retail store database containing information about the object 118. Upon receiving the coded information from the processing module 108, the information provider 104 queries the database 122 to find up-to-date product information about the object 118. For example, the information for a prescription drug retrieved by the information provider 104 may include dosage quantities, intervals and/or warnings that may or may not be included on the prescription drug label. When the identifier 120 is associated with a food object, the information may be current cost, ingredients, usage, and nutritional data from the database 122.

After the information provider 104 receives the information from the database 122, the information provider stores the information locally as a voice message for the mobile communication device 102 and notifies the mobile communication device about the voice message. The user may be notified of the voice message by any suitable means, such as hearing a distinctive ring or by having an envelope graphic appear on the display 116 of the mobile communication device 102. Upon receiving the voicemail notification, the user may retrieve the voice message by dialing the information provider 104 on the mobile communication device 102. At that point, the receiving module 110, which may be any receiver capable of receiving communication signals, receives the information from the information provider 104 and passes the information to the processing module 108. The processing module 108 then sends the voice message to the speaker 114, to be outputted to the user in real time.

The user is given the option to select a language for outputting the information by the processing module 108. Therefore, if the user does not speak English, the user is able to scan the identifier 120 and receive the information about the object 118 in a language that the user speaks. This allows the user to learn information about the object 118 before the user decides to purchase or to use the object. For example, when the user scans the identifier 120 on a child's toy, the user may receive any up-to-date recalls and/or safety information about the object 118. The user has assurance that the object 118, such as a child's toy, is still safe to use because mobile communication device 102 provides the user with up-to-date information about the object. The processing module 108 sends the voice message to the speaker 114 to be outputted in the language pre-selected by the user. The processing module 108 additionally stores the information received from the information provider 104 in the memory 112, which allows the user to listen to the information whenever it is convenient for the user or if the user has forgotten the information. For example, the processing module 108 may use the information for a prescription drug stored in the memory 112 to provide the user with reminders about what time to take and the dosage for the prescription drug. The user additionally has the option to receive the information from the information provider 104 as both a voice message and a text message outputted on the display 116.

The display 116 is a liquid crystal display (LCD) screen or any other screen capable of displaying text or graphics. If the mobile communication device 102 receives the information as a text message, the processing module 108 outputs the text message on the display 116. For example, if the user receives a shopping list for a recipe that includes the object 118, the shopping list may be outputted as a voice message and/or a text message. The shopping list allows the user to make sure that everything needed to make the recipe is purchased while the user is still at the store. The user is therefore able to use the information received by the mobile communication device 102 and make a more informed decision when considering purchasing the object 118.

Figure 2:
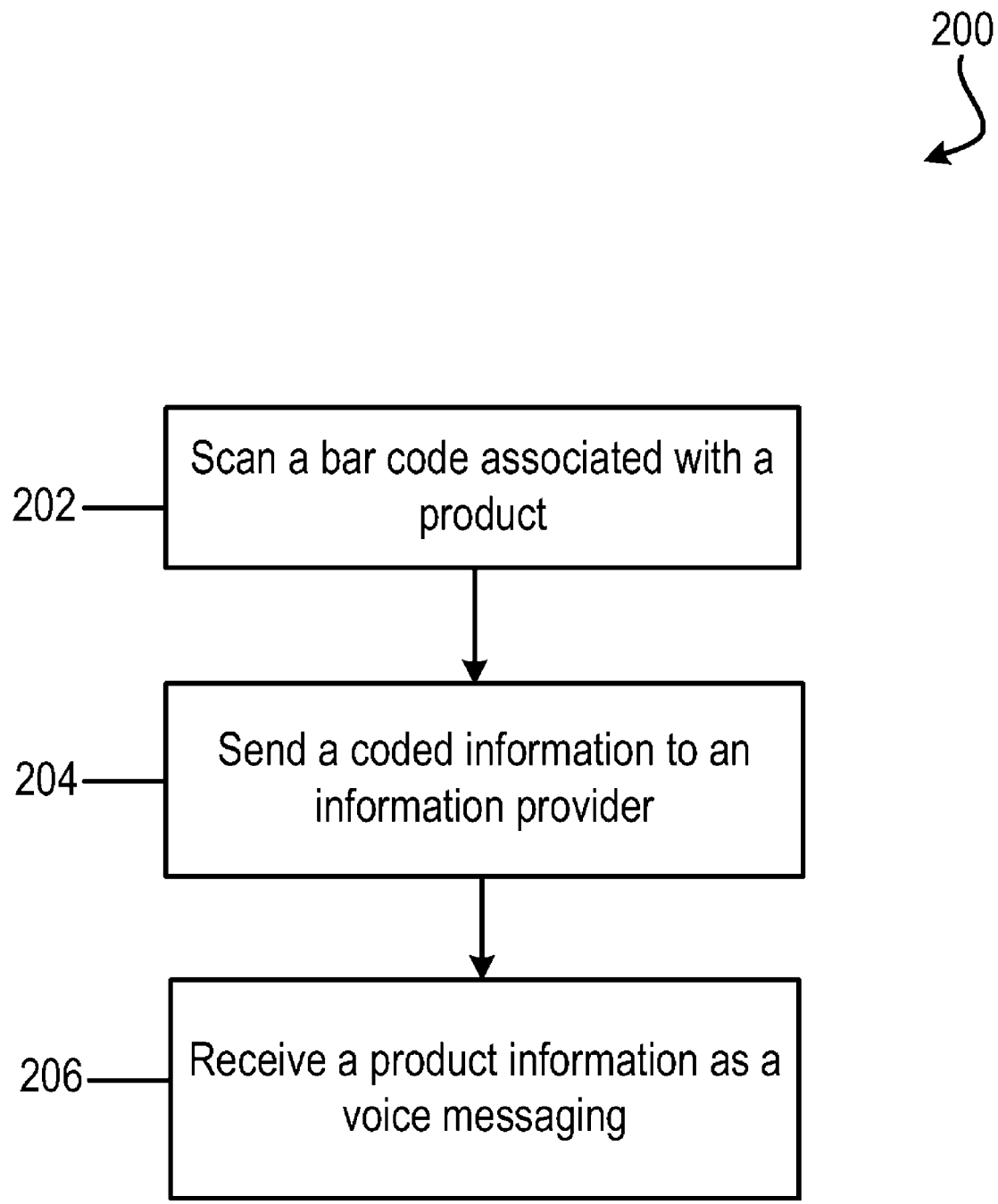
FIG. 2 is a flow chart of a method for receiving product information from scanning a barcode associated with a product.

FIG. 2 shows a flow chart of a method 200 for receiving information from scanning a identifier associated with a object. At block 202, the mobile communication device scans a identifier associated with a object. The mobile communication device sends the coded information from the identifier to an information provider at block 204. At block 206, the mobile communication device receives a information for the object from the information provider as a voice message. The information is up-to-date information, such as a recall for the product associated with the identifier scanned.

Figure 3:
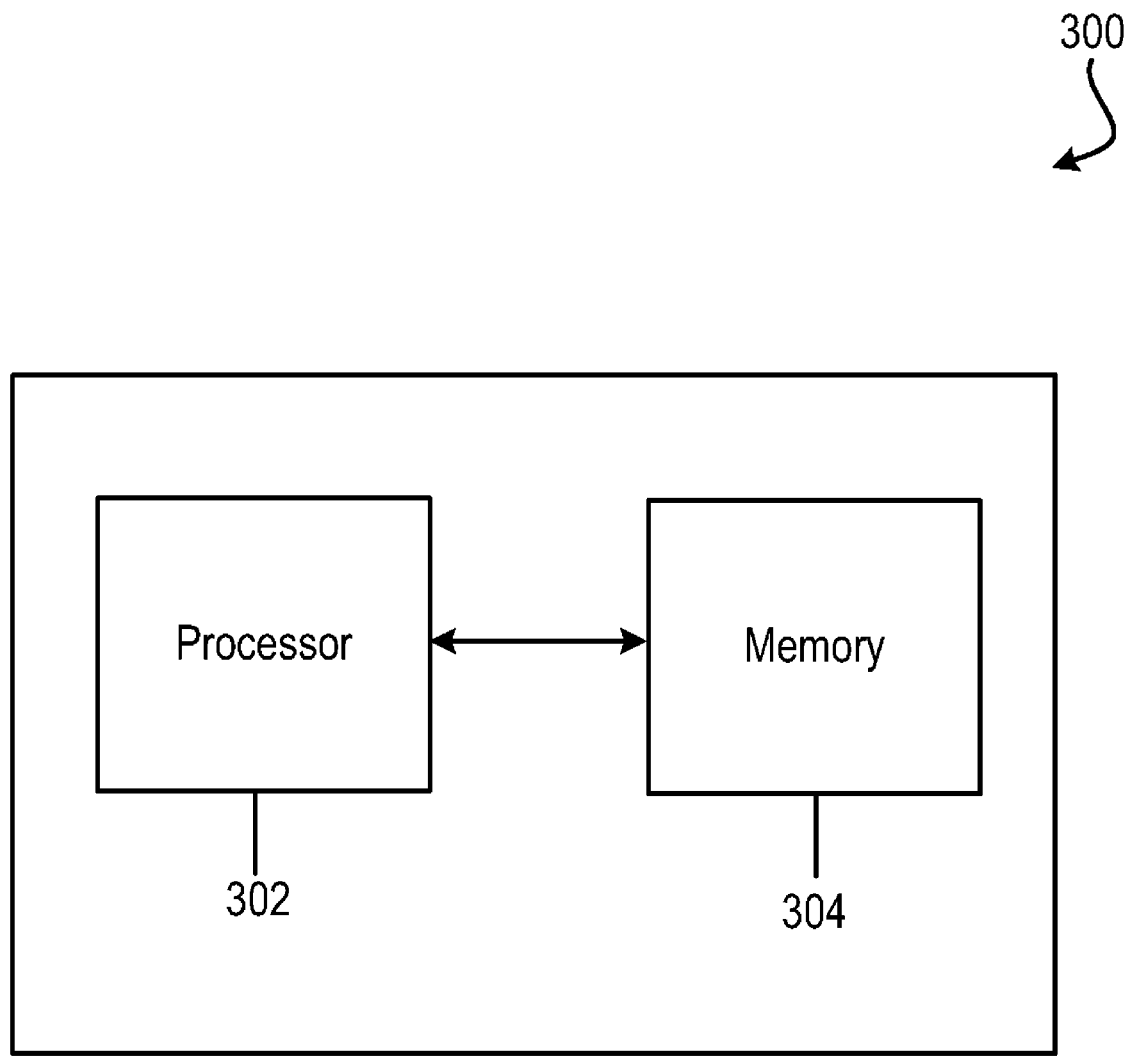
FIG. 3 is a block diagram of a data processing device.

FIG. 3 shows a block diagram of a data processing device 300 comprising a processor 302 and a computer-readable medium such as a memory 304. The memory 304 stores a set of instructions to manipulate the processor to perform the method 200 of FIG. 2 above. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

While the computer-readable medium is shown to be a single medium, the term "computer-readable medium" includes a single medium or multiple media, such as a centralized or distributed database, and/or associated caches and wireless providers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosed subject matter is considered to include any one or more of a computer-readable medium or a distribution medium and other equivalents and successor media, in which data or instructions may be stored.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A mobile communication device comprising:
   a scanner configured to scan a barcode; and
   a receiving module configured to receive information about the barcode as a voice message from a wireless service provider, the voice message being generated at the wireless service provider from product information retrieved from a database,
   wherein the wireless service provider includes an information provider that determines where to retrieve the product information from one or more of an object manufacturer database and a retail store database, wherein the wireless service provider supplies the mobile communication device with a wireless voice service and a wireless data service, and wherein the barcode is associated with a single food product, the voice message including information about a plurality of food products for a recipe including said single food product.

2. The mobile communication device of claim 1 wherein the information comprises recall information.

3. The mobile communication device of claim 1 wherein the information is a reminder to take a medication.

4. The mobile communication device of claim 3 wherein the information is additionally a reminder of how much of the medication to take.

5. The mobile communication device of claim 1 wherein the voice message is in a language selected by a user of the mobile communication device.

6. The mobile communication device of claim 1 wherein the information is additionally received as a text message.

7. A method for obtaining a product information on a mobile communication device, the method comprising:

scanning the barcode associated with a product;

sending a coded information to an information provider, wherein the information provider determines where to find the product information from one or more of an object manufacturer database and a retail store database;

receiving a notification that the information provider has the product information stored locally at the information provider as a voice message;

connecting with the information provider via a wireless voice service provided to the mobile communication device by the information provider; and receiving the product information for the barcode as the voice message directly from the information provider over the wireless voice service connection provided by the information provider, wherein the barcode is associated with a single food product, the voice message including information about a plurality of food products for a recipe including said single food product.

8. The method of claim 7 wherein the product information comprises up-to-date recall information about the product.

9. The method of claim 7 wherein the product information is a reminder to take a medication.

10. The method of claim 9 wherein the product information is additionally a reminder of how much of the medication to take.

11. The method of claim 7 wherein the voice message is in language selected by a user of the mobile communication device.

12. The method of claim 7 wherein the product information is additionally received as a text message.

13. A mobile communication device comprising:

a scanner configured to scan a barcode associated with a product;

a processing module in communication with the scanner, the processing module configured to send a coded information received from the scanner to a wireless service provider, wherein the wireless service provider supplies the mobile communication device with a wireless voice service and a wireless data service, and wherein the wireless provider includes an information provider that uses the coded information associated with the barcode to determine where to find product information associated with the product from one or more of an object manufacturer database and a retail store database; and a receiving module in communication with the processing module, the receiving module operably configured to receive the product information from the wireless service provider as a voice message and send the product information to the processing module, wherein the barcode is associated with a single food product, the voice message including information about a plurality of food products for a recipe including said single food product, the recipe being part of the product information retrieved from the one or more of the object manufacturer database and the retail store database.

14. The mobile communication device of claim 13 wherein the product information comprises up-to-date recall information.

15. The mobile communication device of claim 13 wherein the product information is a reminder to take a medication.

16. The mobile communication device of claim 15 wherein the product information is additionally a reminder of how much of the medication to take.

* * * * *